United States Patent

Mears, Jr.

[15] 3,635,097

[45] Jan. 18, 1972

[54] PUSHBUTTON TUNER WITH SLIDING BLOCK AND RACK

[72] Inventor: Donald B. Mears, Jr., Thompsonville, Conn.

[73] Assignee: General Instrument Corporation, Newark, N.J.

[22] Filed: Oct. 23, 1970

[21] Appl. No.: 83,277

[52] U.S. Cl. .................................................. 74/10.33, 334/7

[51] Int. Cl. .................................................. F16h 35/18

[58] Field of Search ...............74/10.33, 10.31, 10.29, 10.27, 74/10.37, 10.35, 10.8, 10; 334/7

[56] References Cited

UNITED STATES PATENTS

| | | | |
|---|---|---|---|
| 1,935,355 | 11/1933 | Gaubert | 74/10.8 |
| 1,947,069 | 2/1934 | Thomas | 74/10.8 X |

*Primary Examiner*—Milton Kaufman
*Attorney*—James and Franklin

[57] ABSTRACT

A tuner, capable of pushbutton or manual operation, is provided with structure to inhibit lost motion in both tuning modes. The same structure also serves as guide means which restricts the direction of motion of an adjustable tuning member. A body or chassis, movable in a housing, has a first part connected to the adjustable tuning member and a second part having a rack formed on its undersurface. A guide block, atop and contiguous the second part, is acted upon by a resilient member which urges the rack into constant engagement with an adjacent driving or tuning gear, thereby to minimize lost motion. The first and second parts of the body move as a unit and rotation of the gear is converted into translation of the tuning member. The manual tuning means comprises a shaft rotatably mounted in the housing with a second gear thereon, adjacent and in driving relation to the first gear. The shaft end adjacent the second gear is received in a wedge-shaped opening and has a tapered section which passes through that opening and bears against the walls thereof. A spring active on the other end of the shaft, in conjunction with the opening a tapered shaft section and the tapered opening walls bearing thereagainst, causes the second gear to be urged into constant engagement with the first gear, thereby to minimize backlash at that point.

18 Claims, 5 Drawing Figures

INVENTOR.
DONALD B. MEARS

BY
James and Franklin

ATTORNEY

PATENTED JAN 18 1972

3,635,097

INVENTOR
DONALD B. MEARS
BY James and Franklin
ATTORNEY

PUSHBUTTON TUNER WITH SLIDING BLOCK AND RACK

The present invention relates to a tuner capable of both pushbutton and manual operation and is adapted to eliminate backlash and thus provide for more accurate and reproducible tuning.

Tuners capable of manual and pushbutton operation, for use in automobile radios and like devices, are known in the art. Since an automobile is constantly in motion, manual tuning is rather difficult, and is made all the more arduous when done by a driver who must divide his attention between driving and tuning. Obviously, the less attention given to tuning, the safer will be the driving.

A requirement for such pushbuttons is that they accurately select the chosen station. If this is not done, the driver may well find it necessary to manually adjust the tuning to the desired station even after actuating the appropriate pushbutton, thereby rendering the pushbuttons virtually useless. Diminution of lost motion in the pushbutton tuning mechanism, then, is a primary requirement for the given station to be reliably selected upon each pushbutton actuation. Accordingly, one feature of the present invention inhibits lost motion in the pushbutton tuning mode.

Most automobile radios are provided with only four or five pushbuttons (each capable of selecting a single given station) as this is all the spatial restrictions of such a radio can conveniently accommodate. From time to time, a driver may wish to switch to a station which has not been preset, and consequently must resort to manual tuning. However, it is rare that one accurately tunes to a given station in a single attempt. More often, one will pass the station and have to reverse tuning directions at least once before finally obtaining optimum reception. This task is made somewhat more onerous where there is lost motion upon reversing tuning direction. Particularly for one driving, the amount of tuning necessary to obtain optimum reception must be minimized, thereby necessitating the eliminating of lost motion in the transmission system. Accordingly, the present invention provides structure which also inhibits lost motion in the manual tuning mode.

Many structures are known which can minimize backlash, but they are generally relatively complex and hence expensive. They may require the use of special gears, or manufacture of parts to very close mechanical tolerances, all adding materially to cost.

Another operational problem to which tuners are subject is attaining fine and accurate movement of the tuning element. Resistance to movement requires the exertion of excessive force to bring about tuning. Any tendency toward stickiness of movement makes for inaccuracy in tuning. Any tendency of the tuning element to twist or cant makes reproducibility of tuning very uncertain, particularly in a pushbutton tuner, where a given pushbutton should, but often does not, produce precisely the same tuning effect on each actuation.

It is a primary object of the present invention to provide a tuner which inhibits lost motion of an adjustable tuning member, and which does so with simple and inexpensive but effective structure.

It is another object of the present invention to provide a tuner in which both manual and pushbutton tuning is substantially free of backlash.

Yet another object of the present invention is to provide a simple, inexpensive, easily assembled structure for mounting the moving part of a tuner for free, accurately controlled and directed tuning movement with no appreciable tendency to stick, twist or cant.

A further object of the present invention is to provide a tuner with guide structure which directs the motion of an adjustable tuning member along a desired path.

The present invention is here shown embodied in a pushbutton permeability-type tuner in which a tuning coil is mounted in a housing assembly and a movable core member effects tuning adjustment. A movable body is connected to the core member and moves the latter in and out of the coil as desired for tuning adjustment. A rack is formed on the undersurface of the body, and a gear engages the rack causing movement of the body and hence the core member. A block member is active on a step formed on the body and directs the motion of the body along a path parallel to the longitudinal axis of the core member. A spring is active on the housing and the block member, urging the latter toward, and urging its rack into meshing engagement with, the gear, thereby eliminating lost motion between the rack and gear.

Both manual and pushbutton tuning mechanisms are provided to rotate the gear. A second gear is engageable with the first gear and is operable by a knob external of the housing.

The second gear is mounted on a shaft which at one end is operatively connected to one wall of the housing and spring-urged axially. The shaft has its other end received in an opening in an opposite wall of the housing. The shaft has a taper, which is received through the opening, and which bears against the walls thereof, which walls converge toward the shaft. This causes the shaft to be constantly urged toward the first gear; consequently, the first and second gears are in a minimal backlash engagement.

To the accomplishment of the above, and to such other objects as may hereinafter appear, the present invention relates to a tuner capable of manual and pushbutton operation, as defined in the appended claims and as described in this specification, taken together with the accompanying drawings, in which:

Figures 1, 2, 3, 4:
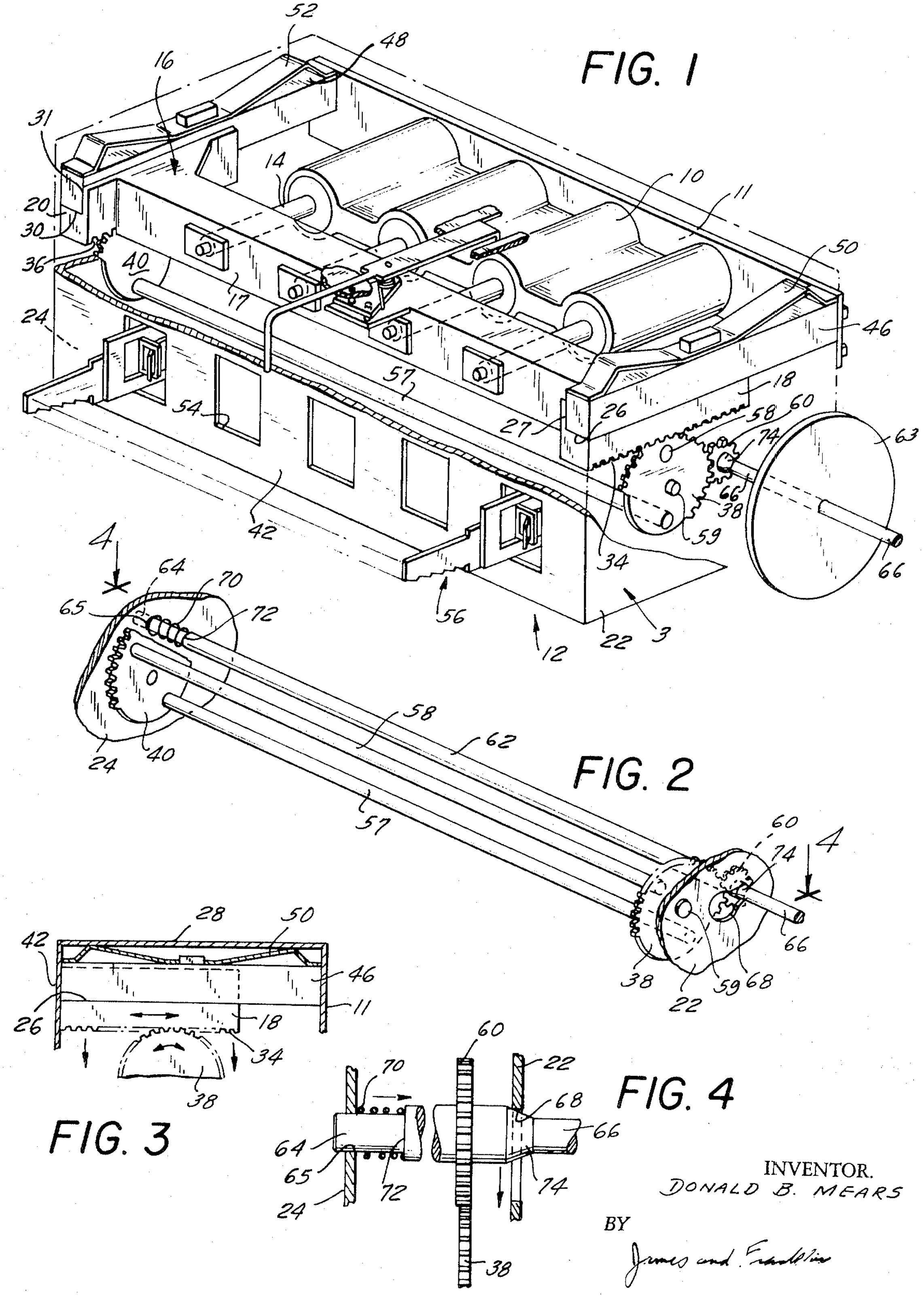
FIG. 1 is a partially cutaway perspective view of a preferred embodiment of the present invention.
FIG. 2 is a fragmentary perspective view of the structure which urges the manual tuning means into constant engagement with the tuning gear.
FIG. 3 is a cross-sectional view taken along the line 3—3 of FIG. 1
FIG. 4 is a cross-sectional view taken along the line 4—4 of FIG. 2.

Referring to FIG. 1, a preferred embodiment of the present invention is shown associated with a permeability-type tuning mechanism 10. However, the instant invention is not limited to that type of tuner, but may be associated with any tuning mechanism which requires movement of at least one component part. The coils 10 are fixed to the back wall 11 of the housing assembly generally designated 12. Received in each coil is a movable core member 14, which member is movable axially within that opening to effect tuning adjustment. The movement of the core members 14 is produced by attaching them to the movable body 16 which is restricted to motion parallel to the longitudinal axis of the core members 14. The body 16 comprises a beam member 17 which extends substantially the length of the housing 12, and integral with the ends of the member 17 are the side parts 18 and 20 which are adjacent the sidewalls 22 and 24 of the housing assembly 12. Formed on the upper portion of the side parts 18 and 20 are the horizontal and vertical flat surfaces 26, 27 and 30, 31 respectively, the vertical surfaces 27 and 31 facing the respective sidewalls 22 and 24, and the horizontal surfaces 26 and 30 facing toward the top of the assembly 12. On the lower portions of the parts 18 and 20 are formed the respective racks 34 and 36′ engageable with and driven by the respective gears 38 and 40 producing essentially horizontal movement of the body 16. As seen in FIG. 3, the clockwise rotation of gear 38 moves the body 16 toward backwall 11 and counterclockwise rotation of gear 38 moves that body toward the front housing wall 42. With the movement of the body 16, the core members 14 are appropriately moved within the coils 10 to produce the desired tuning.

It is to be noted that while one gear 38 and one rack 34 would suffice to move the body 16, the provision of a gear and rack at each end of member 17 provides a balanced structure which does not tend to pivot about either end of the member 17, thereby restricting its motion to a direction parallel to the longitudinal axis of the core members 14.

Means must be provided to support and guide the body 16. In accordance with the present invention that means performs that function in a substantially frictionless manner, making for smooth and easy tuning action, and at the same time acts to take up backlash, making for accurate and readily reproducible tuning, particularly with pushbutton actuation. It is here that the surfaces 26, 27 and 30, 31 of the members 18 and 20 respectively function. A pair of slide bars 46 and 48 fit against the surfaces 26, 27 and 30, 31 respectively. These slide bars extend substantially the full length of travel of the members 18 and 20 and are mounted in the housing so as to have substantially no fore-and-aft play, as by snugly fitting against the front and back housing walls 42 and 11 respectively. The bars 46 and 48 are free to move vertically however, and springs 50 and 52 respectively are compressed between the housing top wall 28 and the slide bars 46 and 48 respectively, thereby urging the slide bars downwardly into sliding engagement with the surfaces 26, 27, and 30, 31 respectively and also urging the racks 34 and 36 downwardly into complete meshing engagement with gears 38 and 40 respectively. The slide bars 46 and 48 are made from, or are provided with bearing surfaces composed of, some material having a low coefficient of friction (e.g., Teflon). As a result, as the gears 38 and 40 are rotated, the body 16 moves back and forth smoothly, easily and without binding, and the resilient meshing aid provided by openings 50 and 52 substantially eliminate backlash between gears 38 and 40 and racks 34 and 36 respectively. Consequently, the tuner illustrated in FIG. 1 is capable of both pushbutton and manual tuning. For pushbutton tuning, as is conventional, a plurality of openings 54 are formed in the front wall 42, each receiving therethrough a pushbutton tuning assembly 56. The tuning mechanism 56 is of a type known in the art, which upon depression is capable of selecting one preset station by its interaction with rocker arms 57, 58 secured to and extending between gears 38, 40. As the rocker arms 57, 58 are positioned by the particular pushbutton assembly 56 which is actuated, the gears 38, 40 are appropriately rotated and the tuning body 16 is correspondingly positioned. Because backlash is substantially eliminated between gears 38, 40 and the racks 34 and 36 on tuning body 16, a high degree of accuracy of tuning is achieved.

For manual tuning a shaft 62 is provided, connected by friction clutch plate 63 to an accessible tuning shaft 65. A gear 60 is fast on shaft 62 and meshes with gear 38. The rocker arms 57, 58 act in the manual tuning mode to cause gear 40 to rotate with gear 38. The gears 38 and 40 act on racks 34 and 36 to move body 16 back and forth. The rotation of shaft 65 adjusts the tuning of the set.

Figure 5:
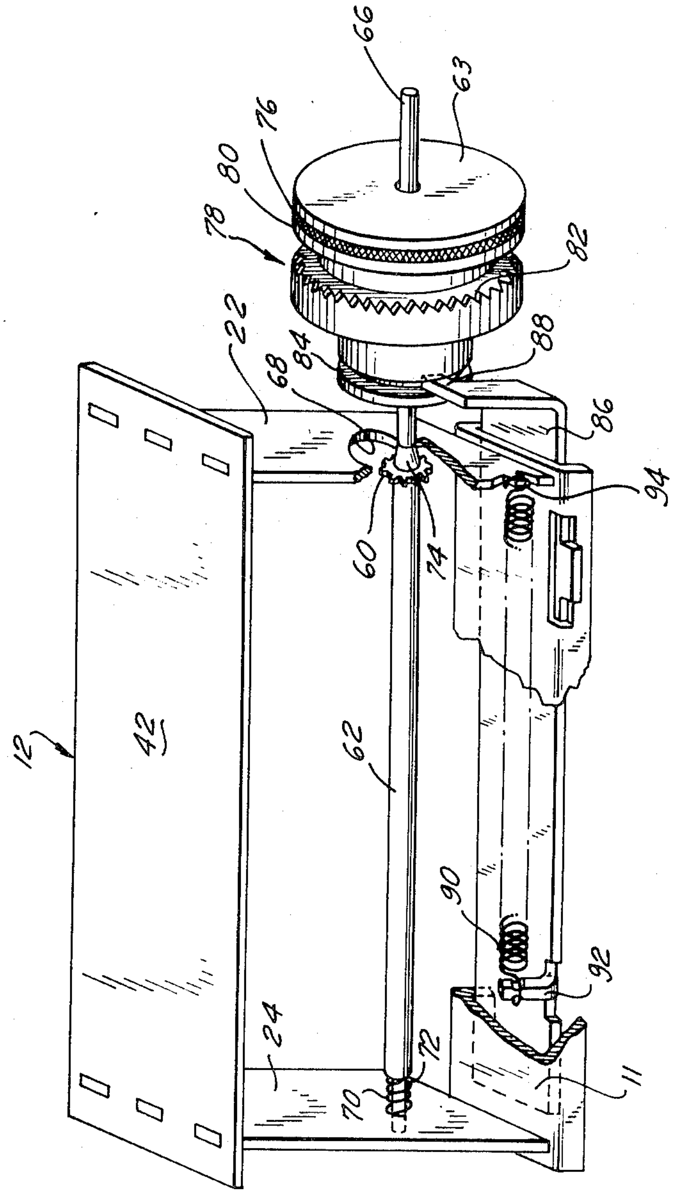
FIG. 5 is a fragmentary perspective view, partially broken away, of the structure shown in FIG. 2 together with the declutching mechanism.

Means are provided to minimize backlash between shaft 65 and gears 38 and 40. (The structure previously described minimizes backlash between those gears and racks 34 and 36.) As best shown in FIGS. 2 and 4, the shaft 62 has an and 64 journaled in an opening 65 in sidewall 24, and its opposite end 66 passes through a wedge-shaped opening 68 in wall 22. A spring 70 is compressed between the sidewall 24 and a shoulder 72 formed on the shaft 62, thereby urging shaft 62 axially to the right as viewed in the drawings, toward wall 22. The shaft 62, at its end 66, has a tapered section 74 which is received in opening 68 and which bears against the walls of that opening. The section 74 tapers downwardly to the right as viewed in the drawings, while the sidewalls of the opening 68 converge in a direction substantially radially outwardly from gear 38. As shown in FIG. 5, friction clutch plate 63 is fast on shaft 62 and is provided with a clutch facing 76. Freely rotatably received on shaft 62 is the clutch element generally designated 78, that element comprising a clutch plate 80, a crown gear 82, and a grooved bushing 84 all integrally connected together for simultaneous rotation. A declutch plate 86 is slidably mounted on the rear wall 11 of the housing, is provided with a finger 88 received in the groove of the bushing 84, and is spring-urged toward the clutch plate 63 by means of spring 90 tensioned between lug 92 on the declutch plate 86 and a portion 94 of the side housing wall 22. The normal action of the declutch spring 90 is to move the clutch element 78 to the right as viewed in FIG. 5, thereby pressing the clutch plate 80 and clutch facing 76 against clutch plate 63 and producing a driving connection between the crown gear 82 and the shaft 62, thereby causing the shaft 62 to rotate when the crown gear 82 is rotated. At the same time the spring 90 will urge the clutch plate 63 to the right, and because that plate 63 is fast on the shaft 62, the shaft 62 will also be urged to the right, thus bringing its tapered section 74 into engagement with the walls of the opening 68 and urging shaft 62 and gear 60 toward gear 38. The action of the spring 70 on the shoulder 72 assists in this action. As a result, when the manual drive clutch is engaged, the gear 60 is urged into a tight meshing engagement with the gear 38 such that the direction of manual tuning may be reversed without accompanying backlash. When the manual clutch is declutched, as will be the case when any one of the pushbutton mechanisms 56 is depressed (the mechanism for interconnecting the pushbuttons with the clutch being conventional, and therefore not here shown), the declutch plate 86 will be moved to the left as viewed in FIG. 5 against the action of the spring 90, and thus will remove from the shaft 62 the main force which had been effective to urge the shaft 62 to the right and thus, by means of the opening 68 and the tapered shaft section 74, urging the gear 60 into engagement with the gear 38. However, during the declutched condition of the assembly, the spring 70 is active on the shaft shoulder 72 so as to urge the shaft 62 to the right thus, through interengagement of that tapered shaft section 74 and the walls of the opening 68, maintaining the gear 60 in engagement with the gear 38. Since no drive is being effected through those gears while the clutch is declutched, the presence or absence of backlash between them is of no importance but it is desirable that they remain in mesh, and the spring 70 is chosen to have a strength appropriate to that end.

The structure here described is particularly, although not exclusively, suited for use in automobile radios, since the elimination of backlash in all tuning modes provides for reliable and convenient station selecting. Since the slide bars are fabricated from Teflon or like material, no lubrication is required between the engaging surfaces of slide bars 46, 48, and parts 18 and 20. The surfaces 26, 27, and 30, 31 additionally serve as guides which effectively prohibit any twisting or canting of the body 16 in the plane of beam 17. The resilient downward urging of racks 18 and 20 insure that backlash between those racks and gears 38 and 40 is eliminated. Thus, a user, upon repeated depressions of the pushbutton mechanisms 56, will reliably obtain the given preset station. Likewise, manual tuning is also effected without backlash, due to the resilient urging of gear 60 into tight mesh with gear 38 as well as the gear-rack interaction above described. This permits the user to reliably and conveniently select, and optimally tune, any station.

While but a single embodiment of the present invention is herein disclosed, it will be appreciated that many variations may be made in the details thereof, without departing from the spirit and scope of the invention as defined in the following claims.

I claim:

1. A tuner comprising a housing assembly, an adjustable tuning member mounted in said housing assembly, a body movably mounted on said assembly, operatively connected to said tuning member and effective to produce tuning adjustment thereof, said body comprising a rack, a gear rotatably mounted in said assembly engaged with and effective to drive said rack, means active on said gear to rotate the latter, said body and gear being mounted in said assembly so as to have relative movement toward one another, said housing assembly comprising urging means active on one of said body and gear to urge it to move toward the other, and said housing assembly comprising a guide member having a surface defining the desired path of movement of said body, said body engaging and sliding over said surface.

2. The tuner of claim 1, in which said urging means is active on said member to urge it operatively toward said body.

3. The tuner of claim 2, in which said member is interposed between said urging means and said body.

4. The tuner of claim 2, in which said guide member is interposed between said urging means and said body and said body is interposed between said member and said gear.

5. The tuner of claim 1, in which said urging means is resilient.

6. the tuner of claim 1, in which said guide member at said surface is formed of a plastic material with a low coefficient of friction.

7. The tuner of claim 1, in which said gear-rotating means comprises a rotatably shaft carrying a second gear in operative driving relation with said first gear, said shaft having a first end operatively connected to a first wall of said housing assembly, said housing assembly having an opening in a second wall thereof opposite said first wall, second urging means active on said first shaft and effective to urge said shaft axially, said shaft comprising a tapered section which passes through said opening in said second wall, said opening being bounded by walls converging relative to one another and extending generally radially relative to said first gear, the direction of taper of said shaft section, the direction of convergence of said opening walls, and the direction in which said shaft is urged by said urging means being cooperatively such that said shaft section and opening walls are urged into engagement with one another and said shaft is wedged thereby toward said first gear, thereby to cause firm driving engagement between said gears.

8. The tuner of claim 7, in which said second urging means is resilient.

9. The tuner of claim 1, in which said guide member surface comprises first and second surface parts engaged by said body, said first part facing said gear and engaging the top of said body, said second part being at an angle to said first part and engaging a side of said body, both of said surface parts extending in the desired direction of movement of said body for tuning adjustment.

10. A tuner comprising a housing assembly, an adjustable tuning member mounted in said assembly, a body movable in said assembly, operatively connected to said tuning member and effective to produce tuning adjustment thereof, said body comprising a rack, a gear rotatably mounted in said assembly engaged with and effective to drive said rack, means active on said gear to rotate latter, said body being mounted in said housing assembly so as to be movable toward said gear, said housing assembly comprising a guide member on the opposite side of said body from said gear, said guide member having a guide surface over which said body is adapted to slide, said guide member being movable in a direction toward said body to bring its said surface into engagement with said body, and resilient means active on said member to urge it into engagement with said body and thereby to urge said rack on said body into engagement with said gear.

11. The tuner of claim 10, in which said guide member surface comprises first and second surface parts engaged by said body, said first part facing said gear and engaging the top of said body, said second part being at an angle to said first part and engaging a side of said body, both of said surface parts extending in the desired direction of movement of said body for tuning adjustment.

12. The tuner of claim 10, in which said gear-rotating means comprises a rotatable shaft carrying a second gear in operative driving relation with said first gear, said shaft having a first end operatively connected to a first wall of said housing assembly, said housing assembly having an opening in a second wall thereof opposite said first wall, second urging means active on said first shaft and effective to urge said shaft axially, said shaft comprising a tapered section which passes through said opening in said second wall, said opening being bounded by walls converging relative to one another and extending generally radially relative to said first gear, the direction of taper of said shaft section, the direction of convergence of said opening walls, and the direction in which said shaft is urged by said urging means being cooperatively such that said shaft section and opening walls are urged into engagement with one another and said shaft is wedged thereby toward said first gear, thereby to cause firm driving engagement between said gears.

13. The tuner of claim 12, in which said second urging means is resilient.

14. The tuner of claim 10, in which said member at said surface is formed of a plastic material with a low coefficient of friction.

15. A tuner comprising a housing assembly, an adjustable tuning member mounted in said assembly, a gear member operatively connected to said tuning member and adapted to move the latter to effect tuning adjustment, a rotatable shaft carrying a second gear in operative driving relation with said first gear, said shaft having a first end operatively connected to a first wall of said housing assembly, said assembly having an opening in a second wall thereof opposite said first wall, urging means active on said first shaft and effective to urge said shaft axially, said shaft comprising a tapered section which passes through said opening in said second wall, said opening being bounded by walls converging relative to one another and extending generally radially relative to said first gear and said tapered shaft section slidably engaging said converging walls, the direction of taper of said shaft section, the direction of convergence of said opening walls, and the direction in which said shaft is urged by said urging means being cooperatively such that said shaft section and opening walls are urged into engagement with one another and said shaft is thereby wedged toward said first gear, thereby to cause firm driving engagement between said gears.

16. The tuner of claim 15, in which said urging means is resilient.

17. The tuner of claim 15, in which said urging means urges said shaft toward said second wall, said shaft section tapers downwardly in the direction in which said shaft is thus urged, and said opening walls converge in a direction radially away from said first gear.

18. The tuner of claim 17, in which said urging means is resilient.

* * * * *